United States Patent
Sebenik et al.

[15] 3,637,369
[45] Jan. 25, 1972

[54] FLUIDIZED IRON ORE REDUCTION PROCESS

[72] Inventors: Roger F. Sebenik; Martin O. Gernand; Marnell A. Segura, all of Baton Rouge, La.

[73] Assignee: Esso Research and Engineering Company

[22] Filed: Jan. 7, 1969

[21] Appl. No.: 789,589

[52] U.S. Cl. ..................................................75/26, 75/34
[51] Int. Cl. .....................................C22b 1/02, C21b 13/14
[58] Field of Search ................................................75/26, 34

[56] References Cited

UNITED STATES PATENTS

| | | | |
|---|---|---|---|
| 3,062,639 | 11/1962 | Sterling | 75/26 |
| 3,341,322 | 9/1967 | Bailey | 75/26 |
| 3,393,066 | 7/1968 | Mayer | 75/26 |

OTHER PUBLICATIONS

Newton, Extractive Metallurgy, p. 12 (John Wiley & Sons, Inc. 1967).

*Primary Examiner*—Winston A. Douglas
*Assistant Examiner*—Peter D. Rosenberg
*Attorney*—Manahan and Wright and Llewellyn A. Proctor

[57] ABSTRACT

An improved process for the production of metallic iron by direct reduction of iron ores at relatively high temperatures. The ore is staged in a series of beds, fluidized by contact with ascending gas, and reduced. In ferric reduction zones, ferric oxide (hematite) is reduced to magnetic oxide of iron (magnetite), and the latter is thence reduced to substantially ferrous oxide (wustite). In the ferrous reduction zone, or zones, the ferrous oxide is reduced to metallic iron. By addition or incorporation with the partially reduced ore of a ferrous reduction zone, or zones, of critical amounts of salts formed from Groups I-A, II-A and III-A metals, and metalloids, particularly halide salts and nonoxide-forming hydroxides and carbonates of such metals, the overall rate of reduction of the ore is promoted and metallization increased without significant adverse effects due to bogging. The process has special utility with regard to the reduction of specular hematite ores, particularly with carbon monoxide and carbon monoxide-containing gases.

9 Claims, No Drawings

FLUIDIZED IRON ORE REDUCTION PROCESS

The demand for high-grade blast furnace feeds, in recent years, has stimulated efforts to improve the reducibility of iron ores, e.g., oxidic iron ores or ores consisting essentially of iron oxides. Due to diminishing reserves it has become very desirable to utilize finely divided or particulate ores. Finely divided ores are suitable for use in blast furnaces, however, only when agglomerated, and the agglomerates are possessed of sufficient mechanical strength to withstand the weight of the burden. Various processes for forming pellets or agglomerates have become well known, and it has become common to add various and sundry materials to the ore, inter alia, to increase the mechanical strength and improve the reducibility of the agglomerates for use as feeds to blast furnaces.

Various types of direct iron ore reduction processes are also known, these being used to treat or prepare pellets or agglomerates, directly or indirectly, for feeding to blast furnaces. These include, e.g., kiln processes and, in particular, fluidized bed processes. In the former, particulate ore and various other materials are charged directly into a rotary kiln, and the ore is reduced at temperatures below the melting point of the metal. Usually, limestone or dolomite is added, with coke (and sometimes additional fuel, and air), to prevent sulfur retention, or passage of sulfur from the reducing agent and fuel to the reduced metal. In such processes, the resultant reduced iron products are often discharged as pellets or agglomerates or, in any event, readily agglomerated by post-treating techniques.

Various undertakings have had as their objective the development of a practical fluidized iron ore reduction process, especially a staged process, because it offers considerable advantages. In the latter, within ferric reduction zones, iron oxides, e.g., hematite or ferric oxide, is charged to a first fluidized bed, or beds, and the oxide is reduced, at elevated temperatures, to magnetite or magnetic oxide or iron. In the same bed or in a subsequent bed, or beds, the magnetic oxide is thence reduced to wustite or ferrous oxide. In a final stage, or stages, the wustite or ferrous oxide is reduced in a ferrous reduction zone, or zones, to metallic iron.

In such processes, as in any direct reduction process, it is a major goal to achieve a high rate of reduction because the greater the reduction achieved, the greater the fuel savings and production capacity of the furnace. One method of increasing the rate of reduction is to increase or improve the reducing potential of the gases. Elevation of temperature is another approach. Such expedients would certainly appear desirable, and often necessary, particularly when attempting to reduce the specular hematite ores. These ores are quite difficult to reduce, particularly with carbon monoxide and carbon monoxide-containing gaseous mixtures, especially as compared with the earthy hematite ores which are more easily reduced. While high-purity hydrogen can reduce specular hematites, providing sufficient time is allowed, the use of such gas is costly and undesirable. The use of carbon monoxide-containing gas, on the other hand, actually retards reduction and makes the attainment of high metallizations difficult, if not impossible. Elevation of temperature has been found to produce only slight improvements in reduction rate, when treating specular hematites. In any regard, major process changes to bring about small benefits in reduction rate are entirely impractical.

A major disadvantage in increasing the reducing power of the gas, e.g., by use of relatively pure hydrogen, or in elevating temperatures is that the tendency toward bogging is greatly accelerated. Bogging, which is manifested by a "stickiness" of the particles, occurs well below the sintering temperature of the ore. Crystalline forms of iron appear on the surface of the individual particles, these growing and extending from active sites. These forms of metal attach, or tend to attach, one to another upon contact so that the individual iron ore particles cling or weld together to form aggregates or agglomerates. This phenomenon militates against the very operability of the process so that slumping of the bed and loss of fluidization occurs. The rate of metallization is decreased. Bogging increases with increasing holding time, and as the degree of metallization increases. It is particularly acute in the ferrous reduction zone, or zones.

In direct iron ore reduction processes, of certain types, an approach to the problem of achieving higher reduction rates has been to use additives known to the art as reduction rate promoters. Ore has thus been pretreated, or treated prior to reduction, by incorporation therewith of relatively small amounts of salts, especially the salts of alkali and alkaline earth metals, by tumbling the salt with the ore, by balling or spraying with aqueous salt solutions, and the ore then charged into kiln-type reactors. Reduction has been achieved at a more rapid rate, at lower temperatures, and higher metallizations have been achieved. These additives, however, while suitable in some direct reduction environments, have heretofore proven completely ineffective in fluidized iron ore reduction processes.

The introduction of ore, pretreated in such manner, and passed through the several stages of a fluidized iron ore reduction reactor has, in fact, often proven ineffective in promoting reduction rate. In some circumstances, the reduction rate is actually retarded. Far worse, however, the reduction itself has been severely hampered by the slumping of the beds of partially reduced pretreated iron ore particles which tend to stick together by surface-to-surface contact, particularly as the degree of reduction increases. Bogging has proven extremely acute in the ferrous reduction stages, even under normal circumstances, but the presence of these additives in the partially reduced pretreated ore greatly intensifies the problem. Such additives, in short, have proven an abomination for use in pretreating ore for use in fluidized iron ore reduction processes.

It is, nonetheless, the basic objective of the present invention to obviate these and other disadvantages of the prior art. In particular, it is an object to provide a new and improved staged fluidized iron ore reduction process wherein faster rates of reduction and higher metallizations can be achieved, and this without significant adverse effects due to bogging. A more particular object is to provide a process of such type particularly suitable for processing specular hematite ores, even where carbon monoxide and carbon monoxide-containing gases are employed as reducing agents.

These and other objects are achieved in accordance with the present invention which contemplates the use of certain types of additives added to or otherwise incorporated with the partially metallized fluidized ore, or ore contained in one or more of the ferrous reduction stages. It has now been found that relatively small and minor quantities of certain of the salts of the metals, and metalloids, of Groups I-A, II-A and III-A, of the Periodic Table of the Elements (E. H. Sargent and Company; copyright 1962 Dyna-Slide Co.), can be directly added to a ferrous reduction bed, or beds, in quantity sufficient to accelerate or promote the rate of reduction, and increase metallization without significant intensification of bogging.

It has been found that salts of Group I-A, II-A and III-A metals, such as those which could be formed by neutralization of strong acids, are particularly effective. This includes specifically the halide salts of these metals, particularly the halide salts of the alkali and alkaline earth metals, including boron and aluminum. Most preferred of these additives are the salts of the Group I-A metals of the Periodic Table of the Elements, particularly those having an atomic number ranging from 3 to about 20. These salts are more preferred because of their greater effectiveness, particularly from a cost-effectiveness standpoint. The chloride salts have been found particularly suitable. Illustrative of such salts are the simple chloride salts of lithium, sodium and potassium. The simple chloride salts of calcium, strontium, and barium are also suitable, as are the chloride salts of boron, aluminum, and other Group I-A, II-A and III-A metals. While the chloride salts are particularly effective, bromides and fluorides, e.g., are also effective. Hydroxides and carbonates which are relatively stable at reaction conditions are also effective for reduction rate promotion, specifically the hydroxides and carbonates of the metals of Group I-A. The hydroxides and carbonates of Groups II-A and III-A metals are ineffective as reduction rate promoters inasmuch as they do not penetrate the ore structure, but instead form oxides externally at the conditions of operation. This is not to suggest, however, that the presence of these oxides is necessarily deleterious inasmuch as they often possess antibogging effects, and hence these and similar additives might be beneficially added, with the reduction rate promoters, to the ferrous reduction stage, or stages.

Suitably, from about 0.1 to about 6 percent, and preferably from about 0.5 to about 2 percent, based on the weight of the ore, of certain of these salts can be directly added in the ferrous reduction stage, or stages, to promote reduction without significant intensification of bogging. The different salts vary in their effectiveness, and greater or lesser amounts are required dependent upon the nature of the salt and its state of subdivision. Higher concentrations than those stated can thus be used with somewhat greater effectiveness but generally the increase in reduction rate effectiveness increases at a decreasing rate, and in some instances too great a concentration of a salt retards the rate of reduction.

The additives are added, in finely divided state, to the stages wherein some degree of metallization has been initiated. Preferably, the additives are charged to the initial ferrous reduction stage, where more than one ferrous reduction stage is employed. The additives can be utilized in wet or dry state, i.e., as a slurry, solution or as a dry powder. The additives can be applied as slurries or solutions, dried, and then charged to a ferrous reduction stage or charged with the liquid. Where charged with a liquid, the dispersing medium is preferably one which will generate heat or reducing gas, or both, e.g., a hydrocarbon fuel, alcohol, or the like. Where water is used as a dispersing medium, it should be used conservatively since it lessens the reducing quality of the gas. Preferably, the additives are added as fine dry powder of average particle size ranging about 200 mesh (Tyler Series), and finer. In general, the finer the particle size, the greater the effectiveness, and particle sizes ranging down in the micron and submicron sizes are particularly effective. Particle sizes ranging 10 microns, and finer, are particularly effective.

The reasons for the effectiveness of these additives, directly added to a ferrous reduction stage, or stages, to accelerate the rate of reduction is not fully understood. While applicants do not desire to be bound by any specific theory on mechanism, it is believed that the additives promote the reduction by changing the structural development of the ore particles as would otherwise occur during normal reduction of untreated ore. In normal reduction, as metallization begins, and iron begins to appear, areas of oxide become encased by the forming metallic iron. As reduction proceeds, more zones of iron appear and grow together, these becoming larger and larger. These zones become continuous and more dense, and the nonreduced, encapsulated zones become more and more shielded, relatively large entrapped zones of oxide remaining. As a result, as reduction proceeds, the particles become less and less permeable to reducing gases and complete reduction and high metallization become more and more difficult to achieve. In sharp contrast, when treated in accordance with the present invention, the ore is completely converted to a coarse, porous structure, and there is only the appearance of submicron-sized grains of metallic iron.

Observation thus shows definite characteristics which distinguish between normal reduction and reduction of the treated ore. After treatment with the additive, observation shows that reduction proceeds grain-by-grain rather than in and around pores and surfaces. Oxide zones do not become encased or shielded, and dense oxide zones do not form. Reduction proceeds to completion apparently because the oxide is readily accessible to reducing gases. In any event, there results the formation of a very crystalline, oxidelike phase followed by grain-by-grain reduction to form metallic iron grains which are crystalline with sharp, well-defined straight edges. The oxidelike phase appears the results of the presence of the additive. Conceivably, a compound forms between the additive and iron oxide when the proper stoichiometry exists. Even when incompletely reduced, the nonreduced zones are not encapsulated by iron and are yet amenable to further reduction. What this means, therefore, is that the treated ore develops into a more porous, easier-to-reduce structure during reduction and encased oxide zones are substantially absent. Almost complete reduction with accompanying high metallizations can be achieved.

To obtain optimum benefits of this invention, the additives are incorporated or added early, directly to the ferrous reduction stage, or to the initial stage where several ferrous reduction stages are employed. Earlier addition, or addition of the additives to the ferric reduction stage, or stages, however, is undesirable because this can suppress reduction rate, initially, or certainly promote bogging. In addition, loss of the additive due to dusting and sublimation is increased. These effects are surprising, but explainable. Conceivably, premature treatment with the additives accelerates reduction at the surface of the iron ore particles so that, in effect, the surface becomes masked by deposits of metallic iron, and penetration of the reducing gas to the particle interior becomes difficult. Metallization within the particle interior is thus suppressed. The extent of metallization, in terms of total effect, is therefore lessened. Reduction efficiency is adversely affected. In any event, the net effect, therefore, is that there is not as great a decrease in the total reduction time as can be achieved according to this invention. Worse, the tendency of the ore to bog is greatly accelerated because of simultaneous metallization at the surface of most of the particles.

A feature of this invention is that even the more available and cheaper specular hematite ore can be readily reduced, and metallization increased, even with carbon monoxide or carbon monoxide-containing gases. Heretofore, specular hematite ores have proven too difficult for practical utilization in such manner, and while treatment with high-purity hydrogen gives sufficient rate reduction and metallizations, treatment with hydrogen is, inter alia, economically prohibitive.

Specular hematite, as contrasted with the porous, earthy hematite, is very difficult ore to reduce. The principal differences between the two types of ore relate to differences in crystallite size and crystalline perfection. Specular hematite particles are very dense and crystalline in appearance with essentially no porosity except between particles. Nonspecular hematite particles, on the other hand, are less crystalline, more porous and more irregularly shaped. The crystallite size of the specular hematite is considerably greater than that of the nonspecular hematite, though the lattice parameters are essentially the same and both forms have the $\alpha$-$Fe_2O_3$ structure.

In reduction, both specular and nonspecular hematite ores must pass through the same stages of reduction. In treating ores of the latter type at, e.g., about 1,300°–1,600° F., it is found that the rate of reduction with hydrogen, on the one hand, and carbon monoxide, on the other hand, are not significantly different. High metallizations are readily achieved. When treating specular hematites with carbon monoxide or carbon monoxide-containing gases, however, both reduction rate and extent of metallization are significantly adversely affected. The reason is not known.

It is believed that the reduction behavior of the wustite is related to its crystallite size. Because the reduction process is a solid state transition, the larger specular hematite crystals yield larger wustite crystals than are formed from nonspecular hematite. It is therefore believed that the larger wustite crystals are less reactive than the smaller ones because of the slower diffusion of reducing gases and gaseous reduction products in and out of the larger crystals. Also, there is less surface available for reaction, and the generally more inert the nature of larger, better developed crystals, the more difficult the crystals are to reduce.

The present invention is believed to alter this normal structural development as occurs during reduction, but whatever the mechanism, i.e., whether there is an alteration of crystallite size or an alteration of the crystal species itself, the present process is admirably suitable for the more efficient and economical reduction of specular hematite ores, or mixtures of ores containing specular hematite. In accordance with a preferred mode of practicing the present invention, specular hematite ore is reduced in one or more ferric reduction stages to essentially ferrous oxide, or wustite, after which time the additives of the present invention are added or otherwise incorporated therewith, as heretofore described. It is found that at reduction temperatures, the carbon monoxide or carbon monoxide-containing gases complete the reduction to provide, within similar time periods, metallizations substantially as high as achieved when treating natural hematite under generally corresponding conditions. Moreover, reduction rate and extent of metallization are substantially the equivalent of treating the specular hematite with high-purity hydrogen, but without many of the known disadvantages of using hydrogen.

In a typical operation, in accordance with this invention, particulate, dry, specular or nonspecular hematite ores, or mixtures thereof, are charged to a staged reaction vessel. These ores are contacted with upwardly flowing carbon monoxide, hydrogen or mixtures of these and other gases. The zones contain fluidized beds operated at the same or at varying temperatures and the ore, at different stages of reduction, descends from one bed to the next of the series. Also, the reducing gas in contact with the beds is at a different stage of oxidation within the different zones. There is provided one or more ferric reduction zones operated at temperatures ranging from about 1,000° to about 1,800° F., and preferably from about 1,300° to about 1,600° F., and one or more ferrous reduction zones operated at temperatures ranging from about 1,200° to about 1,700° F., and preferably from about 1,300° to about 1,600° F. The additives for use in promoting rate reduction are charged directly to one or more, including at least the initial, ferrous reduction zone.

The following nonlimiting examples and pertinent demonstrations describe the present invention in terms of such process environment, bring out the more salient features and provide a better understanding of the invention.

A large quantity of specular hematite ore, specifically chosen because it represents a "hard-to-reduce" ore as contrasted with earthy hematite ore, is pulverized in an impact mill to particle size ranging from about 75 to 210 microns (65-200 mesh), and divided into several like portions.

Portions of the ore are charged into a fluidized iron ore reactor as described above. The ore is fluidized by an upwardly flowing reducing gas, as hereafter defined. The gas flows from a zone containing an iron ore at a lower level of oxidation to the next higher level of oxidation, i.e., from the bottom to the top of the reactor. In the top ferric zone, the partially oxidized gas is burned with air to provide heat to the various reduction stages. The reduced ore moves from the top to the bottom of the reactor and from one stage of reduction to the next. The ferric reduction stages, wherein ferric oxides are reduced essentially to magnetic oxides of iron, and thence to ferrous oxide, are operated at 1,500° F. and at substantially atmospheric pressure, as are the ferrous reduction stages wherein the ferrous oxide is reduced, and metallized. The additives are charged to the latter stages, as specifically described.

In the example immediately following, portions of specular hematite ore are charged to the reactor and reduced to wustite and thence, by contact with gaseous mixtures normally strongly reducing to the ferrous ion, the wustite is reduced to metallic iron.

EXAMPLE 1

Table I below presents comparative data showing the results achieved in reducing the wustite to iron. The first column lists the elapsed time in minutes from initiation of reduction of the wustite, to 30 minutes. Columns two and three show the extent of reduction achieved with hydrogen gas, on the one hand, and carbon monoxide gas of substantially similar reducing potential, on the other. The last column records the extent of reduction achieved after addition of an especially preferred species of reduction rate promoter to the wustite, viz, sodium chloride, an alkali metal halide salt.

TABLE I

| Reduction pressure | Atmospheric | | |
|---|---|---|---|
| Reduction temperature | 1,500° F. | | |
| Reduction gas | $H_2$+13% $H_2O$ | 88% CO+12% $CO_2$ | |
| Promoter | None | None | 0.5% NaCl |
| % Metallization* | | | |
| after 6 minutes | 65.2 | 2.8 | 35.6 |
| 8 minutes | 71.6 | 10.3 | 51.7 |
| 10 minutes | 86.4 | 17.4 | 63.6 |
| 15 minutes | 82.6 | 31.0 | 82.2 |
| 20 minutes | 86.0 | 36.0 | 94.1 |
| 30 minutes | 91.5 | 41.5 | 99.3 |

*Calculated from weight loss.

Comparison (columns 2 and 3) of the hydrogen reduction results with results obtained by reduction with the carbon monoxide gas, both without a promoter addition to the ore, shows that the latter gas does not effectively reduce the specular hematite ore. Both thermodynamic considerations and past experience with earthy hematites, however, indicate that the two gas systems should give the same degree of metallization in about the same reaction time. The difficulties associated with the use of carbon monoxide gas in reducing specular hematites are therefore apparent. Surprisingly, however, the addition of the reduction promoter (column 4) overcomes the incompatibility of the carbon monoxide reducing gas and the specular hematite ore to give results even superior to those achieved using hydrogen reducing gas.

EXAMPLES 2-3

When sodium carbonate and sodium hydroxide are admixed with the wustite and reduced, as in the foregoing, the rate of reduction is again increased and metallization improved. The reduction proceeds without significant adverse effects due to bogging. This is shown by the data presented in the following table.

TABLE II

| Promoter | NaOH | $Na_2CO_3$ | None |
|---|---|---|---|
| Promoter concentration, wt. % | ≈1.0% | ≈1.0% | — |
| Temperature | 1,500° F. | | |
| Pressure | 118 p.s.i.g. | | |
| Reduction gas | 13.7% $H_2O$ in $H_2$ | | |
| Elapsed time, min. | % Metallization | | |
| 1 | 18.6 | 21.8 | 18.8 |
| 2 | 40.7 | 47.5 | 29.1 |
| 4 | 74.0 | 81.7 | 48.0 |
| 8 | 91.4 | 95.7 | 60.1 |
| 15 | 94.0 | 96.2 | 68.2 |
| 30 | 95.2 | 96.4 | 76.8 |

In the following example, mixtures of hydrogen and carbon monoxide are employed as the reducing agent (columns 2 and 3), and these runs are compared with a run made with hydrogen gas (column 4). In one of the runs, represented by the data given in the third column, an alkaline earth metal halide salt is employed to promote the reduction of the wustite, obtained initially by reduction of a specular hematite ore. Column 1, as previously, lists the extent of metallization in minutes from initiation of the reduction reaction.

EXAMPLE 4

TABLE III

| | Promoter | | |
|---|---|---|---|
| | None | CaCl₂ | None |
| Promoter concentration, weight, percent | | 1.05 | 1.500 |
| Temperature, °F | 1,500 | 1,500 | 1,0500 |
| Pressure | Atmospheric | Atmospheric | Atmospheric |
| Reduction gas* | (¹) | (²) | (³) |
| | Percent metallization** | | |
| Elapsed time, min.: | | | |
| 4 | 41.0 | 42.5 | 57.8 |
| 6 | 53.3 | 66.3 | 64.9 |
| 8 | 58.9 | 82.6 | 69.6 |
| 10 | 62.4 | 91.4 | 72.1 |
| 15 | 65.9 | 94.4 | 77.4 |
| 20 | 68.0 | 94.9 | 80.5 |

¹ 54% H₂, 6.5% H₂O.
² 36% CO, 3.5% CO₂.
³ H₂O in H₂.

NOTE.—*Gas rates for all runs were sufficiently high to make composition changes due to reaction effects negligible; **All oxide in the reduced iron product calculated as FeO.

It will be observed by comparison of columns 2 and 3 that the presence of the promoter results in a continued high rate of reduction even after high metallization is achieved. This is in contrast to the rapid reduction rate decline shown by the unpromoted run. Even the reduction made with the gas free of carbon oxides (column 4) loses reduction rate more rapidly as metallization increases.

Thus it can be concluded that the promoter overcomes the adverse effects of carbon oxide gases even in the reducing gas mixture. Thus, the calcium chloride, after 20 minutes pretreatment, produces a product 94.9 percent metallized. Even with hydrogen, the product is only 80.5 percent metallized. Yet thermodynamic considerations would suggest that the reducing power of these two gases is essentially the same at the temperature used. Thus carbon oxide slows the reduction rate but the promoters used in accordance with this invention can admirably overcome, or more than offset, this effect.

It is thus quite clear that the rate and final degree of reduction of hematite ores, including specular hematite ores, can be improved by addition of these promoters to the ferrous reduction stages. A corollary to this is that higher reductions can be obtained at lower temperatures than normally required. In general, the same degree of metallization can be achieved, e.g., by use of the promoters, as normally achieved by elevation of temperature by about 200° or 300° F. or higher. This is generally illustrated in the following example.

Promoted wustite, obtained from specular hematite ore, can be reduced to high metallizations, using synthesis gas, at temperatures as low as 1,350° F. The improvement in this ore's reduction behavior at this low temperature when promoters are used is shown in table IV below. Both sodium chloride and calcium chloride are effective promoters, but at the 1 percent weight level the initial reduction is faster with sodium chloride. Also, the final metallization for the sodium chloride treated ore is slightly better than that for calcium chloride treated material.

EXAMPLE 5

TABLE IV

LOW-TEMPERATURE REDUCTION OF TREATED ORE

Temperature—1,350° F.
Pressure—Atmospheric
Reducing Gas—63% H₂, 9% H₂O, 23% CO, 5% CO₂

| | Percent Metallization Promoter | | |
|---|---|---|---|
| Elapsed Time | None | 1% CaCl₂ | 1% NaCl |
| 10 minutes | 40.0 | 38.0 | 75.0 |
| 15 minutes | 48.0 | 62.0 | 85.0 |
| 20 minutes | 50.0 | 77.0 | 90.0 |
| 30 minutes | 54.0 | 91.0 | 94.0 |

EXAMPLE 6

When boron trifluoride is added as a gas in dilute concentration with the reducing gas, reduction rate is significantly increased and metallization improved.

Further exemplary of promoters useful in accordance with the present invention are salts of alkali and alkaline earth metals such as sodium sulfate, lithium chloride, lithium carbonate, potassium bromide, beryllium chloride, magnesium fluoride, calcium oxy bromide, calcium sulfate, strontium chloride, barium chloride, barium sulfate, and the like. Exemplary promoters formed from group III metals or metalloids are boron trichloride, aluminum trichloride, and the like.

Having described the invention, what is claimed is:

1. In a process for the production of metallic iron at elevated temperatures, wherein particulate iron ore solids are fed through a series of staged beds, fluidized by contact with reducing gas selected from the group consisting of hydrogen and carbon monoxide containing reducing gases and mixtures thereof, and progressively reduced to provide both ferric and ferrous reduction zones, the improvement comprising adding, directly to a ferrous reduction zone, reduction rate promoters selected from the group consisting of carbonates and hydroxides formed from group I-A metals, halide and sulfate salts formed from groups I-A, II-A and III-A metals, and metalloids, of the Periodic Table of the Elements, in amounts sufficient to increase the rate of reduction at the existing conditions over and above that normally achieved at these conditions but for the presence of the salt.

2. The process of claim 1 wherein said halide salts are chlorides formed from group I-A and II-A metals.

3. The process of claim 1 wherein from about 0.1 to about 6 percent, based on the weight of the ore, is charged into the ferrous reduction zone.

4. The process of claim 3 wherein from about 0.5 to about 2 percent of the additive is charged.

5. The process of claim 1 wherein the additive is charged into the initial zone of a plurality of ferrous reduction zones.

6. The process of claim 1 wherein the ferrous reduction zones are operated at temperatures ranging from about 1,200° to about 1,700° F.

7. The process of claim 6 wherein the temperatures range from about 1,300° to about 1,600° F.

8. The process of claim 1 wherein the iron ore solids consist essentially of specular hematite, and the reducing gas employed is a carbon monoxide-containing gas.

9. The process of claim 8 wherein the reducing gas is a mixture of carbon monoxide and hydrogen.

* * * * *